United States Patent
Mortimer et al.

[11] Patent Number: 6,038,157
[45] Date of Patent: Mar. 14, 2000

[54] FAULT TOLERANT POWER SUPPLY CIRCUIT

[75] Inventors: John H. Mortimer, Mount Laurel, N.J.; Oleg S. Fishman, Maple Glen, Pa.; Simeon Z. Rotman, Englewood; Richard A. Ranlof, Moorestown, both of N.J.

[73] Assignee: Inductotherm Corp., Rancocas, N.J.

[21] Appl. No.: 09/085,914

[22] Filed: May 28, 1998

[51] Int. Cl.⁷ .................................................. H02M 7/515
[52] U.S. Cl. ............................................. 363/136; 363/58
[58] Field of Search ................................. 363/57, 58, 96, 363/136, 139

[56] References Cited

U.S. PATENT DOCUMENTS

| | | | |
|---|---|---|---|
| 3,566,243 | 2/1971 | Landis | 321/2 |
| 3,818,313 | 6/1974 | Rosenstein et al. | 321/45 R |
| 3,946,300 | 3/1976 | Landis | 321/8 C |
| 4,060,757 | 11/1977 | McMurray | 363/57 |
| 4,442,479 | 4/1984 | Makimaa | 363/58 |
| 4,463,414 | 7/1984 | Landis | 363/86 |
| 4,570,212 | 2/1986 | Edwards et al. | 363/138 |
| 4,710,862 | 12/1987 | Asaeda | 363/58 |
| 5,235,487 | 8/1993 | Grüning | 361/18 |
| 5,253,157 | 10/1993 | Severinsky | 363/98 |
| 5,418,706 | 5/1995 | Havas et al. | 363/57 |
| 5,523,631 | 6/1996 | Fishman et al. | 307/38 |

*Primary Examiner*—Jessica Han
*Attorney, Agent, or Firm*—Seidel Gonda Lavorgna & Monaco, PC

[57] ABSTRACT

A fault tolerant power supply circuit for a series resonant load having an inductive impedance. The power supply circuit includes alternately conducting first and second sets of switches for supplying current to the load in alternating directions. One terminal of the load is connected to a point intermediate the switches. A protective coil is connected in series with the load and the point intermediate said switches. In one embodiment of the invention, a di/dt reactor is connected in series between the switches. In that embodiment, one end of the protective coil is connected to the load and the other end of the protective coil is connected to the di/dt reactor at a point intermediate the switches.

10 Claims, 2 Drawing Sheets

FAULT TOLERANT POWER SUPPLY CIRCUIT

FIELD OF THE INVENTION

The present invention relates generally to a power supply for induction heating and/or melting equipment, and in particular to a fault tolerant power supply circuit for a series-resonant inverter that protects sensitive power semiconductor devices from excessive overvoltage or overcurrent conditions and prevents thermally-induced and voltage-induced failures of the semiconductor devices.

BACKGROUND OF THE INVENTION

A conventional series resonant inverter power supply circuit for an induction furnace, or other loads with inductive impedance, includes a DC power source and a plurality of inductive reactors in series with inverter power switching devices, such as silicon controlled rectifiers (SCRs). The inductive reactors limit the rate of change of current in the SCRs during commutation and are often referred to as "di/dt reactors." The SCRs are connected in series with an induction coil, and are triggered to be alternately conductive and non-conductive. With this arrangement, the SCRs alternately allow current to flow through the induction coil, which will flow in alternating directions. This creates an AC current in the coil.

Parallel-resonant inverter power supply circuits are also used to excite induction heating and melting coils. However, series-resonant inverter power supplies are preferred because of their higher efficiency. A problem with series-resonant inverter power supplies is their vulnerability to short circuit conditions on the induction coil. It is relatively common for molten metal spills or pieces of metal scrap being loaded into a furnace to come into contact with the introduction coil, and short out two or more coil turns. This is a serious concern, since a shorted coil can cause severe damage to the inverter power supply.

For example, in the event of a short circuit across two or more turns of the induction coil, an instantaneous and generally catastrophic overvoltage condition across the non-conducting SCRs in the inverter could occur. In the past, attempts were made to deal with such an overvoltage condition, if such a condition were detected at all, by triggering the affected SCRs into conduction in order to eliminate the overvoltage condition across the SCRs. U.S. patents which disclose inverter power supplies and protection measures of the type just described include U.S. Pat. Nos. 4,060,757, 4,570,212, 4,710,862, 5,235,487, and 5,418,706.

However, this method has its drawbacks, not the least of which is that it causes extremely high current to flow through the SCRs which, in turn, produces great amounts of heat within the SCRs in a very short period of time. The SCRs are, in effect, forced to withstand an extremely high current in order to avoid being subjected to an overvoltage. This condition can lead to severe voltage stress on the SCRs and their premature failure.

The present invention solves the problem of overvoltage-induced failure by reducing the overvoltage in the first instance. The present invention adds an inductance in series with the induction coil to suppress the overvoltage that would otherwise occur across the switching devices in the event of a short in the induction coil, thus protecting the switching devices from both severe voltage stress and thermal damage. With the present invention, it is no longer necessary to force the switching devices to absorb high currents to avoid being subjected to overvoltage conditions.

SUMMARY OF THE INVENTION

The present invention is a fault tolerant power supply circuit that protects sensitive power semiconductor devices from excessive overvoltage or overcurrent conditions and avoids both voltage breakdown and thermal failure of the semiconductor devices.

In its broad aspects, the invention is directed to a fault tolerant power supply circuit for a series resonant load having an inductive impedance, the power supply circuit including alternately conducting first and second sets of switches for supplying current to said load in alternating directions, one terminal of said load being connected to a point intermediate said switches, comprising a protective coil connected in series with said load and said point intermediate said switches.

In one embodiment, the invention further comprising a di/dt reactor in goseries between said switches, one end of said protective coil being connected to said load and the other end of said protective coil being connected to the di/dt reactor at a point intermediate said switches.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

While the invention will be described in connection with a preferred embodiment, it will be understood that it is not intended to limit the invention to that embodiment. On the contrary, it is intended to cover all alternatives, modifications, and equivalents as may be included within the spirit and scope of the invention as defined by the appended claims.

Figure 1:
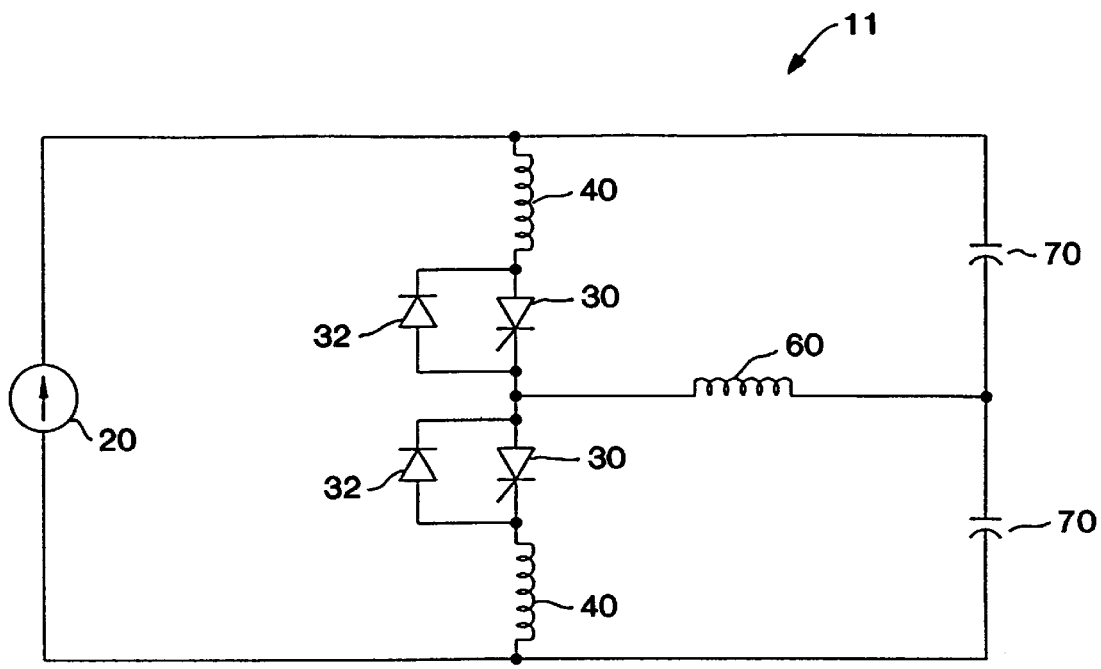
FIG. 1 is simplified schematic diagram of a conventional inverter power supply circuit according to the prior art, showing a conventional arrangement of di/dt reactors.

Referring now to the drawings, wherein like numerals indicate like elements, there is shown in FIG. 1 an illustration of a conventional inverter power supply circuit 11 known in the prior art. The conventional circuit 11 includes a DC power supply 20 for supplying power to a plurality of solid state switching devices 30. The switching devices 30 may be controllably-conductive semiconductor devices such as SCRs, as illustrated in FIG. 1. The switching devices 30 are typically connected to the DC power supply 20 via individual di/dt reactors 40. The di/dt reactors 40 function as current storage devices to provide the switching devices 30 with a constant supply of current. When the switching devices 30 are in operation, they are alternately switched on and off, and thus power is switched from the DC source 20 to the induction coil 60 in a manner which produces an alternating current in the induction coil 60. The alternating current in the induction coil 60 produces a time-varying magnetic field, which may be used to inductively heat or melt metals, or used to produce other work like the rotation of an induction motor. For purposes of this description, the invention will be described in the context of induction heating and melting of metals, although it is understood that the description is illustrative and not limiting.

During the heating, in particular, the melting operations of an induction furnace, the inductor coil 60 can be exposed to short circuits caused by molten metal spills or stray metal pieces which bridge two or more coil turns. When this occurs, application of Kirchoff's Laws reveals that the voltage developed on the commutating capacitors 70 will instantaneously be impressed on the switching device 30 which is non-conductive at the time the short occurs. Thus, a short causes an extremely large reverse voltage to appear across the semiconductor device, which could ultimately destroy it.

Figure 2:
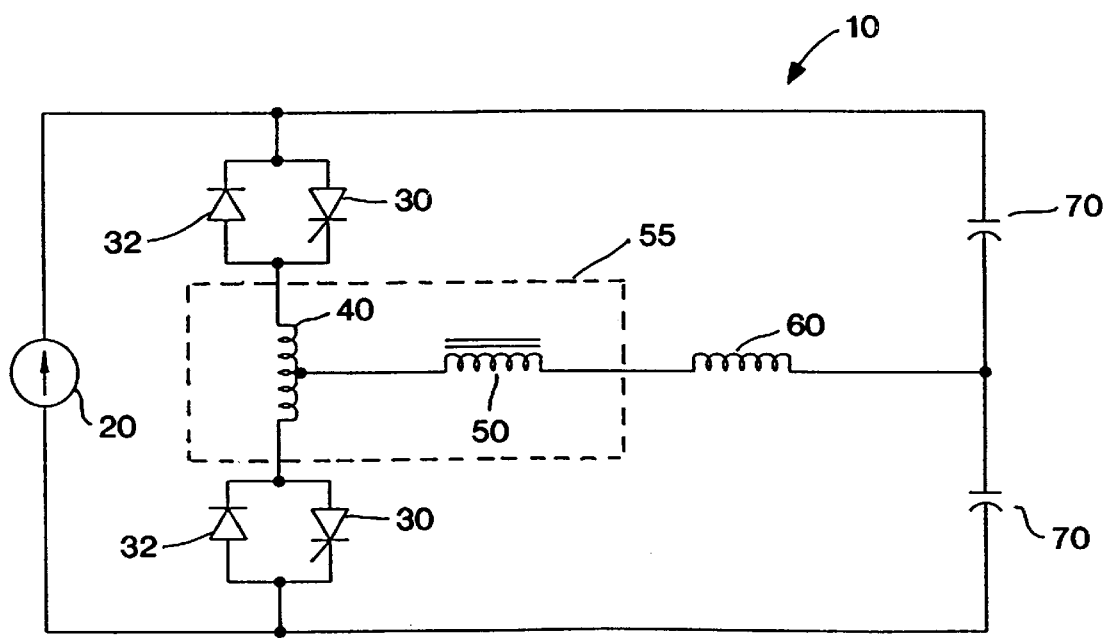
FIG. 2 is simplified schematic diagram of a fault tolerant power supply circuit, showing an arrangement of a di/dt reactor and a choke coil according to the present invention.

Referring now to FIG. 2, there is shown in that figure an illustration of a fault tolerant power supply circuit 10 according to the present invention. The fault tolerant power supply circuit 10 includes a DC power source 20 and a pair of solid state switching devices 30 connected to the power source 20. The solid state switching devices 30 may include, but are not limited to, high-power SCRs and antiparallel diodes 32. Preferably, although not necessarily, a single di/dt reactor 40 is connected in series with and between the pair of solid state switching devices 30, instead of an individual di/dt reactor 40 in series with each switching device 30. A protective coil 50 is connected to the di/dt reactor 40 and in series with an induction coil 60. One end of the protective coil 50 is connected to the di/dt reactor 40, preferably at the reactor's midpoint, and at a point intermediate the switching devices 30. The other end of the protective coil 50 is connected to one end of the induction coil 60. The other end of induction coil is connected in series with the commutating capacitors 70, thus completing the circuit back to the power source 20.

Should an accidental short occur in induction coil 60, the high voltage on the commutating capacitors 70 will be impressed across not only the SCR 30 which is non-conducting when the short occurs, but also across the protective coil 50 and part of the di/dt reactor 40 as well. That is, the voltage on the commutating capacitors 70 will be impressed on the series circuit comprising protective coil 50, part of the di/dt reactor 40, and the SCR 30. Therefore, the voltage across the non-conducting SCR 30 is only a fraction of the capacitor voltage.

The ratio of the inductance of the di/dt reactor 40 to the inductance of the protective coil 50 will be 1/n, where n is at least equal to 1. Hence, if a short occurs, the semiconductor will be subjected to only 1/(n+1) of the voltage on the capacitors. That is, $$V_{SCR} = \frac{1}{1+n} V_{capacitor}$$

For example, if n=2, the non-conducting SCR will be exposed to only one-third of the capacitor voltage. Such a reduction of the voltage across the non-conducting SCR eliminates possibility of semiconductor failure from overvoltage.

The inductance values of the di/dt reactor 40 and the protective coil 50 should be as small as possible compared to the inductance of the load, in order to limit losses in the di/dt reactor 40 and the protective coil 50 and to maximize the efficiency of the power supply.

Figure 3:
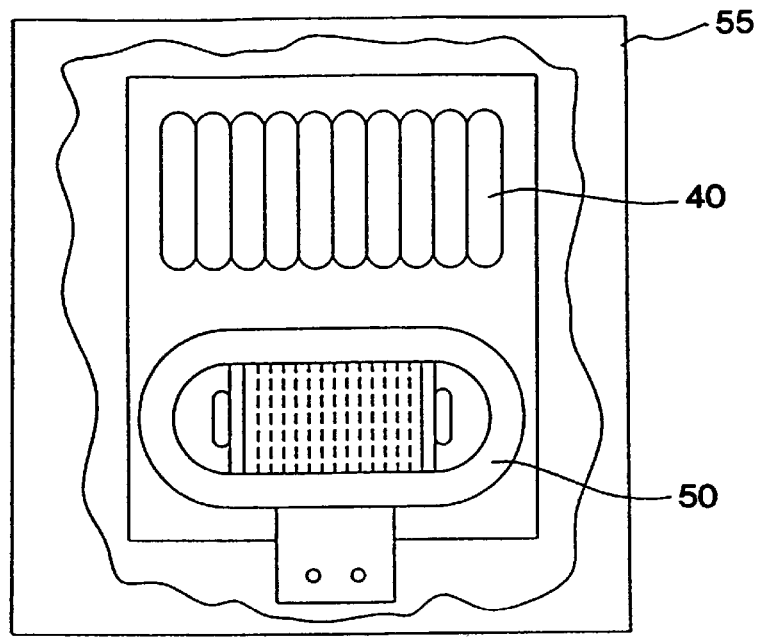
FIG. 3 is a top plan view illustrating one way in which a di/dt reactor and protective coil arrangement according to the present invention may be fabricated.
Figure 4:
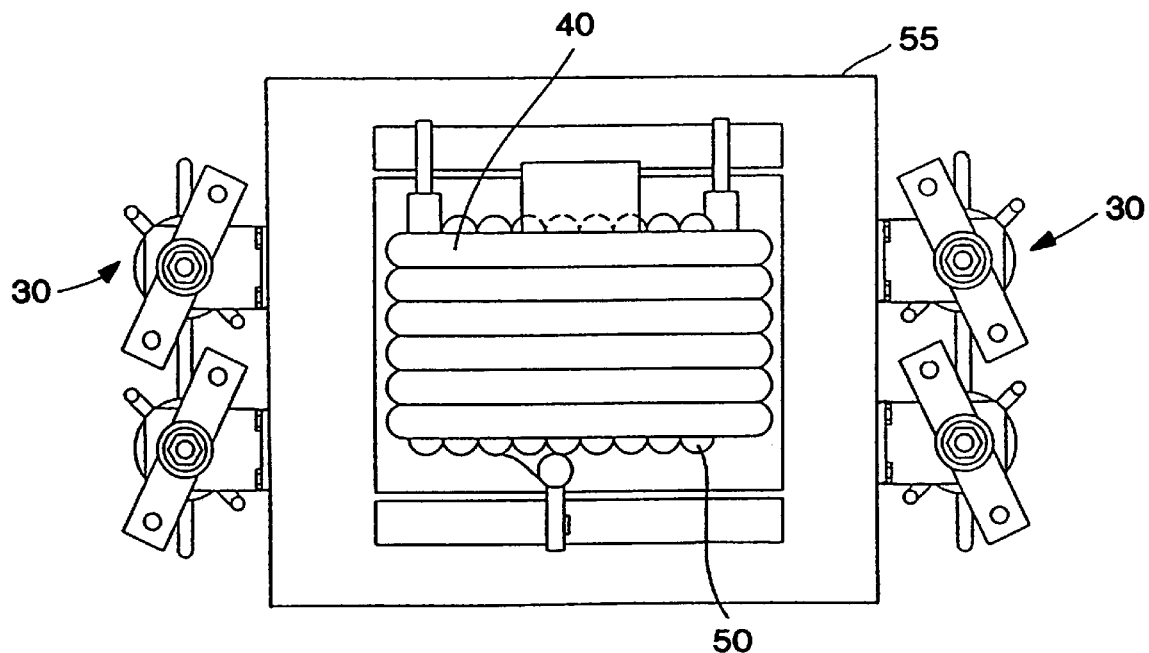
FIG. 4 is a side elevational view of the arrangement of a di/dt reactor and a protective coil shown in FIG. 3.

The present invention lends itself to convenient fabrication in a common housing 55, as shown in FIGS. 3 and 4. The protective coil 50, because of its preferred connection midway between the ends of the di/dt reactor 40, may be interwound in an orthogonal relationship with the di/dt reactor 40. By orthogonal relationship is meant that the longitudinal axis of one coil is approximately normal (i.e., perpendicular) to the longitudinal axis of the other coil. By orthogonally interwinding coil 40 and coil 50, the interaction of the magnetic fields of the two coils is minimized, along with coil packaging volume. An orthogonal relationship tends to reduce magnetic coupling and induced fields produced by the coils. However, it is to be understood that the spatial relationship of the di/dt reactor 40 and the protective coil 50 can vary, if volume is not a concern.

In addition, the di/dt reactor 40 and the protective coil 50 need not be orthogonal at all.

It will be appreciated that the present invention provides a highly effective fault tolerant power supply circuit for protecting sensitive semiconductor switching devices. In addition, the invention's simplicity and unique construction greatly reduce the complexity and cost of the power supply circuit while providing greater efficiency and productivity. These and other advantages of the present invention will be apparent to those skilled in the art from the foregoing specification.

The present invention may be embodied in other specific forms without departing from the spirit or essential attributes thereof and, accordingly, reference should be made to the appended claims, rather than to the foregoing specification, as indicating the scope of the invention.

We claim:

1. A fault tolerant power supply circuit for a series resonant load having an inductive impedance, the power supply circuit including alternately conducting first and second sets of switches for supplying current to said load in alternating directions, one terminal of said load being connected to a point intermediate said switches, comprising a non-saturating protective coil connected in series with said load and said point intermediate said switches.

2. The circuit according to claim 1, further comprising a non-saturating di/dt reactor in series between said switches, one end of said protective coil being connected to said load and the other end of said protective coil being connected to the di/dt reactor at a point intermediate said switches.

3. The circuit according to claim 2, wherein the di/dt reactor comprises two halves, the protective coil is connected to the di/dt reactor between the two halves thereof, and the protective coil has an inductance at least equal to the inductance of one half of the di/dt reactor.

4. The circuit according to claim 1, wherein the protective coil has an inductance smaller than the inductance of the induction coil.

5. The circuit according to claim 1 wherein the protective coil and the di/dt reactor are orthogonally interwound.

6. A fault tolerant power supply circuit comprising:
   (a) a power source;
   (b) a pair of solid state switching devices connected to the power source;
   (c) a non-saturating di/dt reactor comprising two halves and connected between the pair of solid state switching devices; and
   (d) a non-saturating protective coil connected to the di/dt reactor between the two halves thereof and in series with an induction coil;
   wherein the protective coil has an inductance at least equal to that of one half of the di/dt reactor.

7. The circuit according to claim 6 wherein the protective coil has a smaller inductance than the induction coil.

8. The circuit according to claim 6 wherein the protective coil and the di/dt reactor are orthogonally interwound.

9. A fault tolerant power supply circuit comprising:
   (a) a power source;
   (b) a pair of solid state switching devices connected to the power source;
   (c) a non-saturating di/dt reactor having two halves and connected between the pair of solid state switching devices; and
   (d) a non-saturating protective coil, orthogonally interwound with the di/dt reactor, connected to the di/dt reactor between the two halves thereof and in series with an induction coil;

wherein the protective coil has an inductance at least equal to that of one half of the di/dt reactor.

10. The circuit according to claim 9 wherein the protective coil has a smaller inductance than the induction coil.

* * * * *

UNITED STATES PATENT AND TRADEMARK OFFICE
CERTIFICATE OF CORRECTION

PATENT NO. : 6,038,157
DATED : March 14, 2000
INVENTOR(S) : John H. Mortimer et al.

It is certified that error appears in the above-identified patent and that said Letters Patent is hereby corrected as shown below:

Column 2, line 18, after "di/dt reactor in" change "goseries" to - - series - -

Column 3, line 58 after "For example, if" change "$n$-2," to - - $n = 2$," - -.

Signed and Sealed this

Twenty-fourth Day of April, 2001

Attest:

Attesting Officer

NICHOLAS P. GODICI

Acting Director of the United States Patent and Trademark Office